Dec. 28, 1971          M. B. HOWARD          3,630,880
CURRENT COLLECTOR AND ELECTRODE ASSEMBLY
Filed Dec. 23, 1968

INVENTOR.
M. B. HOWARD
BY Young and Quigg
ATTORNEYS

United States Patent Office 3,630,880
Patented Dec. 28, 1971

3,630,880
CURRENT COLLECTOR AND ELECTRODE ASSEMBLY
Murl B. Howard, Bartlesville, Okla., assignor to
Phillips Petroleum Company
Filed Dec. 23, 1968, Ser. No. 785,960
Int. Cl. B01k 3/04
U.S. Cl. 204—286                    9 Claims

ABSTRACT OF THE DISCLOSURE

A current collector is provided for establishing an efficient electrical connection between same and an electrode in an electrolytic apparatus. Said current collector comprises a current-conducting bar and means for expanding at least one end portion of said bar. An electrode assembly comprising an electrode element having at least one of said current collectors mounted in an opening therein is also provided.

---

This invention relates to current collectors and electrode assemblies employed in electrolytic apparatus.

Electrode elements are widely employed in electrolytic apparatus employed in electrochemical conversion processes. Generally speaking, the utilization of such elements involves immersing the element in an electrolyte and passing an electric current from one electrode element through said electrolyte to an oppositely charged electrode element. In one such process a material to be converted is dissolved in the electrolyte and at least a portion of said material is converted into conversion products at one or both of the electrodes. In a variation of this process, the feedstock for the conversion process is bubbled into the electrolyte through a porous electrode element, such as a porous carbon anode, to produce different conversion products.

Very recently it has been discovered that the reaction in an electro-chemical conversion process can be carried out within the confines of the porous electrode element itself. This type of operation is of particular utility in electrochemical fluorination because it makes possible a simple one-step route, at relatively high conversions, to partially fluorinated products which had previously been difficult to obtain. Carrying out the fluorination reaction within the pores of the porous anode, in addition to making possible the direct production of partially fluorinated products, also allows operation at higher rates of conversion, and without the formation of substantial amounts of cleavage products generally produced by the older methods when operating at high conversion rates. The feed to be fluorinated is introduced into the porous anode at a point near its bottom and the fluorinated mixture exits at the top of the anode, generally above the electrolyte level. Passage of feed into the bulk of the electrolyte is avoided.

As indicated above, various types of electrode elements, both porous and nonporous, can be employed in electrochemical conversion processes. One problem which exists in the use of such electrodes is in providing an efficient connection between the source of electric current and the electrode. For good conductance, it is important for the efficiency of the process to have a good connection between the source of current and the electrode because electrolytic cells are generally operated at very low voltages. The problem is especially prevalent when employing an electrode comprising a porous current-conducting element, e.g., a porous carbon electrode. One method of providing a connection between the electrode and the source of electrical current is to employ a "current collector" which is attached to the electrode element. Then, a suitable electrical connection is made between said current collector and the source of electric current.

The present invention solves the above problems by providing a current collector which establishes an efficient electrical connection between itself and the electrode element in an electrode assembly. Thus, broadly speaking, the present invention resides in a current collector comprising a current-conducting bar and means for expanding at least one end portion of said bar; and an electrode assembly comprising an electrode element having at least one of said current collectors mounted in an opening therein.

An object of this invention is to provide a current collector which can be employed for establishing an efficient connection between said collector and an electrode. Another object of this invention is to provide an improved electrode assembly. Other aspects, objects, and advantages of the invention will be apparent to those skilled in the art in view of this disclosure.

Thus, according to the invention, there is provided a current collector, suitable for providing an efficient electrical connection between same and an electrode in an electrolytic apparatus, said collector comprising: a current-conducting bar; contacting means provided on the outer surface of said bar on at least a first end portion thereof; a passageway extending through said bar, the wall of said bar which surrounds said passageway being split longitudinally at said first end portion of said bar; and an expansion means mounted in said passageway.

Further according to the invention, there is provided an electrode assembly comprising an electrode element having a current collector of the invention mounted in an opening of said electrode element.

The provision of an efficient electrical connection between an electrode element and the source of electric current is important for efficiency because electrolytic cells are generally operated at very low voltages. A poor connection will offer resistance to the flow of current. In some electrode assemblies of the prior art the current collector has consisted of a bar mounted in a hole drilled in the electrode element. In such assemblies the hole in the electrode element and the diameter of the current collector are machined to obtain a proper fit at the operating temperature of the cell. Frequently, a current collector and the electrode element will be fabricated from different materials and will present problems of differential thermal expansion between said materials. The present invention avoids the criticality of machining the current collector and the opening in the electrode element to close tolerances. This is especially important when employing electrode elements of porous materials, such as porous carbon, which are reasonably fragile. A further advantage of the current collectors of the invention is that the pressure contact between the current collector and the electrode element is adjustable. Such adjustment can be made, if necessary, under operating conditions. As explained further hereinafter, the various embodiments of the invention provide various means of resilient control of the pressure contact between the current collector and the electrode element.

Figures 1, 1A:
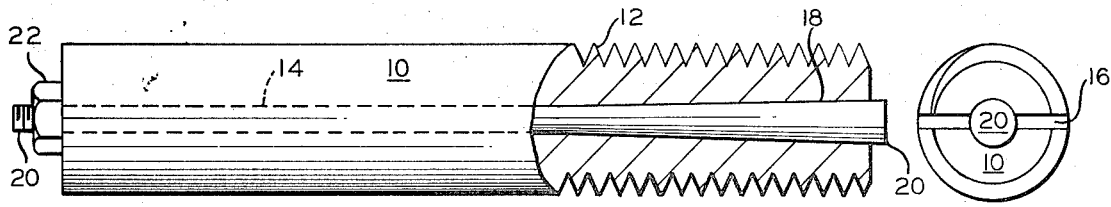
FIG. 1 is a view, partly in cross section, of one current collector in accordance with the invention.
FIG. 1A is a view in elevation of the bottom or right-hand end (as here illustrated) of the current collector of FIG. 1.

Referring now to the drawings, wherein like reference numerals are employed to denote like elements, the invention will be more fully explained. In FIGS. 1 and 1A, there is illustrated a current collector which comprises a current-conducting bar 10 which can be fabricated from any suitable conducting material such as copper, aluminium, etc. Contacting means 12 are provided on the outer surface of said bar on at least a first or lower end portion thereof. As here illustrated, said contacting means comprises threads which can be employed to thread said bar into an electrode element as described further hereinafter. However, it is within the scope of the invention for said contacting means to comprise any suitable arrangement of ridges or other roughened surface. A passageway 14 extends throughout the length of said bar. The wall of said bar 10 which surrounds said passageway 14 is preferably split, as at 16, at said first or lower end portion of the bar. Preferably, said wall is split on a diameter, i.e., on at least two sides as shown in FIG. 1A. However, it is within the scope of the invention to split said wall on one side only, or on more than two sides. Said passageway is preferably tapered outwardly for at least a portion of its length as illustrated at 18. An expansion means comprises an expander rod 20 which is preferably provided with a taper on one end portion thereof which corresponds essentially to the taper of said passageway. Said expander rod 20 can be fabricated from steel or any other suitable metal or material. Compression means are provided for drawing said expander rod into intimate tight-fitting contact with the inner wall of said passageway. As illustrated in FIG. 1, the other or upper end of said expander rod 20 is threaded and extends outside said passageway at the second or upper end of said current-conducting bar 10. Said compression means comprises a nut 22 mounted on said threaded end of said expander rod 20.

Figures 2, 2A:
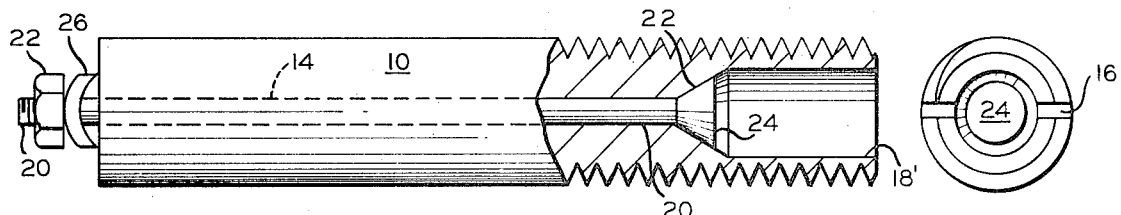
FIG. 2 is a view, partly in cross section, of another current collector in accordance with the invention.
FIG. 2A is a view in elevation of the bottom or right-hand end (as here illustrated) of the current collector of FIG. 2.

In the embodiment of the invention illustrated in FIGS. 2 and 2A, said passageway 14 has an enlarged cross section at said first or lower end portion of the conducting bar 10 as illustrated at 18'. In this embodiment of the invention the tapered portion of said passageway is preferably conical in shape and is located at the inner end 22 of said enlarged cross section. The expander rod 20 is provided with a tapered portion 24 at one end thereof which corresponds essentially to the conically-shaped taper 22 at the inner end of said enlarged cross section 18'. Preferably, said conically-shaped taper 22 will be located at about the midpoint of the split portion of bar 10. The other or upper end of said expander rod 20 is threaded and extends outside said passageway 14 at the second or upper end of current-conducting bar 10. In this embodiment of the invention, the compression means comprises a nut 22 mounted on said threaded end of said expander rod 20 and a spring means 26 disposed between said nut and said second end of current-conducting bar 10. As here illustrated, said spring means 26 comprises a crescent-shaped piece of spring metal. However, it is within the scope of the invention to employ any suitable spring means such as a stiff coil spring.

Figures 3, 3A:
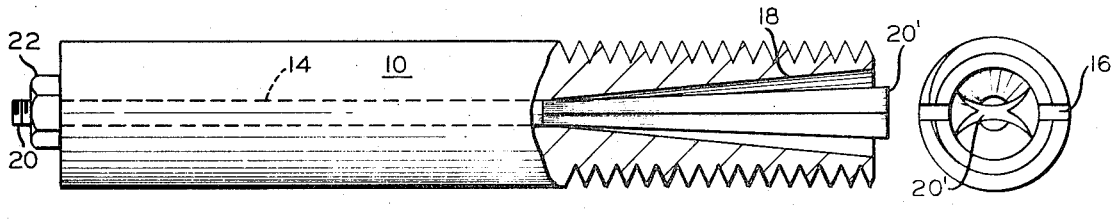
FIG. 3 is a view, partly in cross section, of another current collector in accordance with the invention.
FIG. 3A is a view in elevation of the bottom or right-hand end (as here illustrated) of the current collector of FIG. 3.

In the embodiment of the invention illustrated in FIGS. 3 and 3A, the expander rod 20 is provided at one end portion 20' thereof with a tapered multiarcuate-shaped section having an overall taper corresponding essentially to the taper 18 on said passageway 14. The compression means are like that illustrated in FIG. 1. It will be understood, however, that, if desired, a spring 26 could also be employed under nut 22 in the apparatus of FIG. 3.

Figures 4, 4A:
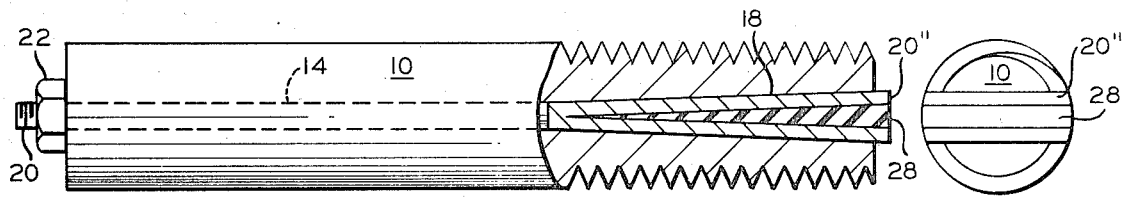
FIG. 4 is a view, partly in cross section, of another current collector in accordance with the invention.
FIG. 4A is a view in elevation of the bottom or right-hand end (as here illustrated) of the current collector of FIG. 4.

In the embodiment of the invention illustrated in FIGS. 4 and 4A, the expander rod 20 is provided at one end portion 20" thereof with a taper which corresponds essentially to the taper 18 on said passageway 14, and said tapered end portion of the expander rod is hollow. A resilient filler 28 is disposed in said hollow portion of said expander rod. Said resilient filler 28 can be any suitable resilient material such as rubber, Teflon, or other polymeric material which is firm but resilient, and which is inert in the environment in which the current collector is used. The other end of said expander rod extends outside of passageway 14 at the second or upper end of bar 10 and is provided with a compression means similarly as described above in connection with FIGS. 1, 2, and 3.

Figure 5:
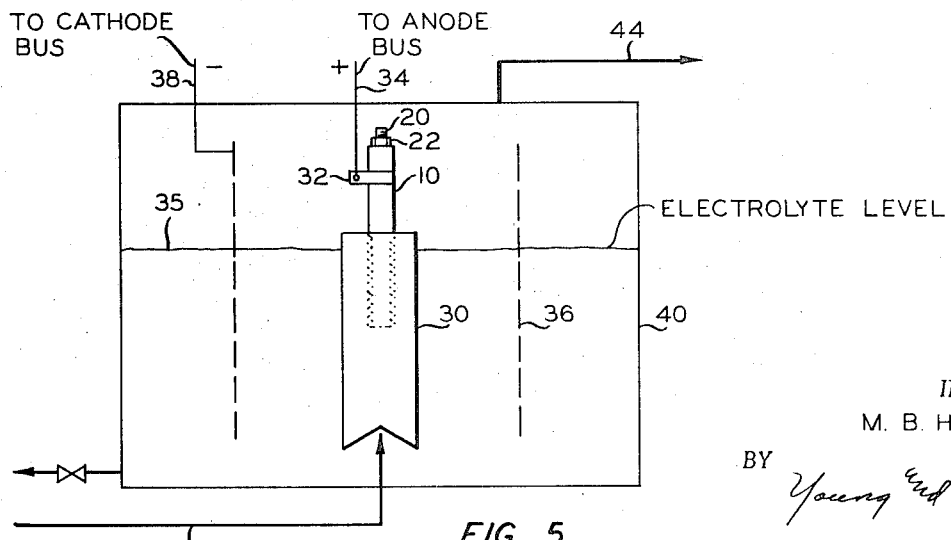
FIG. 5 is a diagrammatic illustration of one cell arrangement illustrating the use of an electrode assembly of the invention.

Referring now to FIG. 5, there is illustrated an electrode assembly in accordance with the invention and a cell arrangement in which said electrode assembly can be employed. In FIG. 5 the anode 30 comprises a cylinder of porous carbon having a cavity formed in the bottom portion thereof. A current collector of the invention is mounted in an opening provided in the upper end of said anode 30 with the lower or first end portion of the current-conducting bar 10 being expanded into intimate contact with the inner wall of said opening in anode 30. Said anode 30 and said current collector mounted therein, as described, comprise an electrode assembly in accordance with the invention. A suitable clamp 32 is clamped around the upper end portion of the current collector and a suitable lead wire 34 therefrom is connected to the anode bus bar. It will be noted that the upper end of anode 30 extends above electrolyte level 35. A circular cathode 36, which can be formed of a suitable metal such as stainless steel depending upon the nature of the electrolyte, surrounds said anode 30 and is connected to the cathode bus by a suitable lead wire 38. Said electrolyte, said anode, and said cathode are disposed in a suitable container 40. In the operation of the cell arrangement of FIG. 5, a feedstock is introduced into the cavity portion of said anode from conduit 42, travels upward through the pores of said anode, and exits from the upper end of the anode above electrolyte level 35. During passage through said anode at least a portion of the feedstock is electrochemically converted. Conversion products together with any remaining unconverted feedstock, and possibly some electrolyte vapors, are withdrawn via conduit 44 from the space above the electrolyte within container 40 and passed to a suitable separation means (not shown) for recovery of products.

The porous electrode element 30 can comprise any porous electrode material suitable for electrochemical conversion reactions taking place within the confines of the pores of that electrode material. It can, for example, consist of a single piece of uniformly porous carbon. It can have a varying porosity with smaller pores at the bottom and larger pores at the top so as to enable deeper immersion into the electrolyte. It can have varying porosity from outside to inside, with smaller pores in the core section and larger pores on the outside in contact with the electrolyte. It can also be a two-section "sandwich" electrode element having large pores in the outer section surrounding a central core, the large pores being in contact with the electrolyte, and the core being comprised of an impermeable current-conductive material such as nonporous carbon or metal.

In the electrode comprised of a porous material such as carbon having a relatively uniform pore size throughout the electrode, the average pore diameter will generally be in the range of 1 to 150 microns, preferably between 40 and 140, and still more preferably between 50 and 120, microns. These values depend somewhat on the depth of immersion of the electrode with deeper immersions requiring somewhat smaller pores. Generally, the permeability of such porous materials will be in the range of 0.5 to 75 darcys, preferably from about 5 to about 75, and still more preferably from about 10 to about 70, darcys. In general, the total porosity will be in the range of about 15 to about 60 percent.

The porous portions of the porous elements of the electrode assemblies of the invention can also be fabricated from any other suitable conducting porous electrolyte resistant material which is compatible with the system, e.g., nickel, iron, various metal alloys, in addition to carbon, which is not wetted by the electrolyte. By "not wetted" is meant that the contact angle between the electrolye and the electrode must exceed 90° in order that capillary forces will prevent substantial invasion of the small pores of the porous element by the electrolyte. Porous carbon, which is economical and readily available in ordinary channels of commerce, is presently preferred for said porous element. Various grades of porous carbon can be used in the practice of the invention. It is preferred to employ porous carbon which has been made from carbon produced by pyrrolysis, but not graphitic carbon. The electrodes of the invention can be fabricated in any suitable shape or design, but must be arranged or provided with a suitable means for introducing the feed reactant material into the feed cavity and then into the pores of the porous element thereof.

The electrode assemblies of the invention can be employed in any convenient cell configuration or electrode arrangement. The only requirements are that the cell body and the electrodes in the cell be fabricated of materials which are resistant to the action of the contents of the cell under the reaction conditions. Materials such as steel, iron, nickel, polytetrafluoroethylene (Teflon), carbon, and the like, can frequently be employed for the cell body. When a nonporous cathode or a nonporous anode is employed which is not fabricated in accordance with this invention (along with a porous anode or a porous cathode of the invention), said nonporous cathode or nonporous anode can be fabricated in any suitable shape or design and can be made of any suitable conducting material such as iron, steel, nickel, alloys of said metals, carbon, and the like. For example, said nonporous cathode can be fabricated from a metal screen or gauze, a perforated plate, and can have a shape complementary to the shape of the porous anode.

The electrode assemblies of the invention comprising a porous electrode element can be employed in a wide variety of electrochemical conversion processes in which the porous electrode element is not wetted by the particular electrolyte being used and wherein the reaction takes place within the confines of the electrode. Some examples of such processes are electrochemical halogenation, electrochemical cyanation, and cathodic conversions such as the reduction of alcohols to hydrocarbons or the reduction of acids to alcohols. One electrochemical conversion process in which the electrode assemblies of the invention are particularly valuable is the electrochemical fluorination of fluorinatable materials in the presence of an essentially anhydrous liquid hydrogen fluoride-containing electrolyte. Thus, for purposes of convenience, and not by way of limitation, the electrode assemblies of the invention have been primarily described in terms of being employed as an anode in the electrochemical fluorination of fluorinatable materials when using said hydrogen fluoride-containing electrolyte.

A current collector in accordance with the invention was fabricated from a 0.5-inch diameter cylindrical copper rod. A 10-inch length of said rod was threaded for approximately 4 inches at one end thereof. A 3/16-inch diameter passageway was then drilled throughout the length of the rod. Said passageway was then reamed with a long taper reamer at the threaded end of the bar until the outlet end of the passageway at the threaded end of the bar had a diameter of about 1/4 to 5/16 inch. Said passageway tapered from this larger diameter down to the original 3/16-inch diameter. The threaded and reamed end of the bar was then split longitudinally by sawing along a diameter thereof for a distance of approximately 4 inches. A steel expander bar having a diameter and taper on one end portion thereof corresponding essentially to the taper of the tapered portion of said passageway was then mounted in the passageway. The upper end of the expander rod extended outside said passageway and a nut was mounted thereon as illustrated in FIG. 1 of the drawings.

In fabricating electrode assemblies in accordance with the invention, for example, an anode, a current collector fabricated as described in the preceding paragraph is mounted in a suitable hole formed in an electrode element. For example, in one embodiment of the invention a current collector fabricated as described above is mounted in a drilled and threaded hole formed in one end of a cylinder of porous carbon having a length of 14 inches and a diameter of 1 3/8 inches. After the current collector is installed in the hole in the porous carbon cylinder, compression nut 22 is tightened to expand the threaded end of the current collector into intimate contact with the inner wall of the porous carbon cylinder.

The above-described electrode assembly can be employed as an anode in an electrolytic cell like that illustrated in FIG. 5. Such a cell can be employed for electrochemically fluorinating inorganic and organic materials under suitable operating conditions depending upon the material being fluorinated. For example, in the conversion of ethylene dichloride to dichlorotetrafluoroethane (Freon 114) and other fluorinated materials using an essentially anhydrous KF·2HF electrolyte, typical operating conditions are as follows:

| | |
|---|---|
| Cell temperature, ° C. | 93 |
| Ethylene dichloride conversion, percent | 41 |
| Feed rate, moles/hr. | 1.43 |
| Faradays/hr. | 2.22 |
| Moles product/hr. | 0.592 |
| Faradays/mole | 1.55 |
| Current density ma./cm.$^2$ | 178 |
| By-products[1], percent | 13.8 |

[1] Products other than Freon 114 or convertible to Freon 114 on recycle.

Further details of electrochemical fluorination processes, and electrodes with which the current collector of the invention can be employed can be found in copending applications Ser. No. 739,506, filed June 24, 1968, by K. A. Williams; Ser. No. 739,507, filed June 24, 1968, by B. H. Ashe, Jr.; and Ser. No. 739,508, filed June 24 1968, by W. V. Childs.

In the above-described current collectors of the invention, e.g., FIGS. 1 to 4, the compression means comprising nut 22 and the threaded upper end of expander rod 20 provides means for adjusting the pressure contact between the current collector and the electrode element in the electrode assemblies of the invention during operation. In many instances this is an important advantage, particularly when the current collector and electrode element are fabricated from different materials. For example, an electrode assembly of the invention made up with a tight pressure contact between the current collector and the anode element at room temperature can loosen at elevated operating temperatures due to differences in thermal expansion. In all the current collectors of the invention, merely tightening nut 22 will solve this problem. In the current collector of FIG. 2, the resiliency of spring element 26 will maintain tension on the expander rod substantially constant, within limits. In the current collector of FIG. 3 the expander rod itself is made resilient by means of the spring-like arcuate-shaped structure. In the current collector of FIG. 4 the expander rod is rendered resilient by means of resilient filler 28. The resiliency provided in the current collectors of FIGS. 2 to 4 is not only advantageous in maintaining substantially constant pressure contact, but is also advantageous when it is necessary to make an adjustment. Said resiliency reduces the chance of rupturing an electrode element by tightening nut 22 too tight.

While the invention has been described above with particular reference to employing the current collectors of the invention in cylindrical electrodes, the invention is not so limited. For example, one or more of the current collectors of the invention can be employed in slab electrodes. For example, an anode assembly was fabricated from a rectangular slab of porous carbon having a thickness of 1¾ inches, a width of 6 inches, and a length of 14 inches. Two current collectors of the invention essentially like that illustrated in FIGS. 1 and 1A were mounted in the top of said anode. The anode assembly was then mounted in a cell in a manner substantially like that illustrated in FIG. 5 and successfully operated for the fluorination of various organic materials.

Also, while the invention has been described with particular reference to employing the electrode or anode assemblies thereof in electrochemical fluorination processes, the invention is not so limited. The porous electrode assemblies employing the current collectors of the invention can be employed in other electrolytic conversion processes, as either an anode or a cathode, for example, electrochemical halogenation, electrochemical cyanation, and cathodic conversions such as the reduction of alcohols to hydrocarbons or the reduction of acids to alcohols.

While certain embodiments of the invention have been described for illustrative purposes, the invention is not limited thereto. Various other modifications of the invention will be apparent to those skilled in the art in view of this disclosure. Such modifications are within the spirit and scope of the disclosure.

I claim:

1. An electrode assembly, suitable for use in an electrolytic apparatus, said assembly comprising:
   a current-conducting electrode element having an opening provided therein;
   an expandable current collector disposed in said opening in said electrode element, said current collector comprising a current-conducting bar having a passageway extending therethrough, said passageway being tapered outwardly for at least a first end portion thereof, and the wall of said tapered passageway being split longitudinally along said first end portion thereof;
   an expander rod, having a taper on a first end portion thereof corresponding essentially to the taper on said passageway, disposed in said passageway with the second end thereof extending outside the second end of said passageway;
   a compression means mounted on said second end of said expander rod for drawing said rod into contact with the wall of said passageway in said bar; and
   a resilient spring means disposed between said compression means and said second end of said bar.

2. An electrode assembly according to claim 1 wherein: said second end of said expander rod is threaded; and said compression means comprises a nut mounted on said threaded end of said expander rod.

3. An electrode assembly according to claim 1 wherein said electrode element comprises porous carbon, and said current-conducting bar is metal.

4. An electrode assembly, suitable for use in an electrolytic apparatus, said assembly comprising:
   a current-conducting electrode element having an opening provided therein;
   an expandable current collector disposed in said opening in said electrode element, said current collector comprising a current-conducting bar having a passageway extending therethrough, said passageway being tapered outwardly for at least a first end portion thereof, and the wall of said tapered passageway being split longitudinally along said first end portion thereof;
   an expander rod, having a taper on a first end portion thereof corresponding essentially to the taper on said passageway, disposed in said passageway with the second end thereof extending outside the second end of said passageway;
   a compression means mounted on said second end of said expander rod for drawing said rod into contact with the wall of said passageway in said bar; and
   a plurality of spring-like, arcuate shaped contacting surfaces formed on the tapered portion of said expander rod.

5. An electrode assembly according to claim 2 wherein: said second end of said expander rod is threaded; and said compression means comprises a nut mounted on said threaded end of said expander rod.

6. An electrode assembly according to claim 4 wherein said electrode element comprises porous carbon, and said current-conducting bar is metal.

7. An electrode assembly, suitable for use in an electrolytic apparatus, said assembly comprising:
   a current-conducting electrode element having an opening provided therein;
   an expandable current collector disposed in said opening in said electrode element, said current collector comprising a current-conducting bar having a passageway extending therethrough, said passageway being tapered outwardly for at least a first end portion thereof, and the wall of said tapered passageway being split longitudinally along said first end portion thereof;
   an expander rod, having a taper on a first end portion thereof corresponding essentially to the taper on said passageway, disposed in said passageway with the second end thereof extending outside the second end of said passageway;
   said tapered end portion of said expander rod is hollow;
   a compression means mounted on said end of said expander rod for drawing said rod into contact with the wall of said passageway in said bar; and
   a resilient filler disposed in said hollow portion of said expander rod.

8. An electrode assembly according to claim 7 wherein: said second end of said expander rod is threaded; and said compression means comprises a nut mounted on said threaded end of said expander rod.

9. An electrode assembly according to claim 7 wherein said electrode element comprises porous carbon, and said current-conducting bar is metal.

References Cited

UNITED STATES PATENTS

| 1,315,785 | 9/1919 | Lutz | 204—297 X |
| 1,467,060 | 9/1923 | Munning | 204—286 |

FOREIGN PATENTS

| 577,733 | 6/1933 | Germany | 204—286 |

FREDERICK C. EDMUNDSON, Primary Examiner

U.S. Cl. X.R.

204—297

UNITED STATES PATENT OFFICE
CERTIFICATE OF CORRECTION

Patent No. 3,630,880    Dated December 28, 1971

Inventor(s) Murl B. Howard

It is certified that error appears in the above-identified patent and that said Letters Patent are hereby corrected as shown below:

Column 8, line 18, "2" should read -- 4 --; line 44, before "end" insert -- second --.

Signed and sealed this 30th day of May 1972.

(SEAL)
Attest:

EDWARD M. FLETCHER, JR.　　　　　　　　ROBERT GOTTSCHALK
Attesting Officer　　　　　　　　　　　　Commissioner of Patents